United States Patent [19]
Weathers

[11] 3,953,051
[45] Apr. 27, 1976

[54] GROUND ANCHOR FOR LAND VEHICLES
[76] Inventor: Beulah B. Weathers, 605 6th Ave. East, Apartment A, Cordele, Ga. 31015
[22] Filed: Feb. 27, 1975
[21] Appl. No.: 553,481

[52] U.S. Cl. .............................. 280/763; 248/156; 248/352
[51] Int. Cl.² ........................................... B60S 9/02
[58] Field of Search .................. 280/150.5, 150 R; 248/156, 352; 52/155; 188/7

[56] References Cited
UNITED STATES PATENTS
2,012,554   8/1935   Travis ............................. 280/150.5
3,238,678   3/1966   Barnett ........................... 280/150.5
3,473,770   10/1969  Edgerton ......................... 248/156

Primary Examiner—Robert R. Song
Attorney, Agent, or Firm—Newton, Hopkins & Ormsby

[57] ABSTRACT

A ground anchor for land vehicles is disclosed comprising a stake having a relatively blunt end adapted to be pounded and a relatively sharp end adapted to be driven into the ground by the pounding of the blunt end. The anchor also includes axle clamping means adapted to be placed at least partially about a vehicle axle and fastening means for fastening the axle clamping means to the stake.

7 Claims, 6 Drawing Figures

GROUND ANCHOR FOR LAND VEHICLES

BACKGROUND OF THE INVENTION

This invention relates generally to land vehicles, and particularly to means for anchoring such vehicles to the supporting ground terrain where the vehicle is to be parked for extended periods of time.

Accordingly, it is a general object of the present invention to provide a ground anchor for a land vehicle.

More particularly, it is an object of the present invention to provide a ground anchor for a vehicle such as a trailer, truck or automobile the use of which may inhibit the vehicle from being overturned under high wind conditions or from being readily removed from its anchored location in an unauthorized manner.

Another object of the invention is to provide a ground anchor which may be readily attached both to a vehicle and to the ground supporting the vehicle.

Another object of the invention is to provide a ground anchor of the type described which may be used to anchor land vehicles of varying structural height above the vehicle supporting ground.

Yet another object of the invention is to provide a ground anchor of the type described which makes use of duplicate parts thereby rendering the device relatively inexpensive to manufacture and assemble.

SUMMARY OF THE INVENTION

In one form of the invention, a ground anchor is provided for a land vehicle comprising a stake having a relatively blunt end adapted to be pounded and a relatively sharp end adapted to be driven into ground upon a pounding of the blunt end. Axle clamping means are provided adapted to be placed at least partially about a vehicle axle. Fastening means are further provided for fastening the axle clamping means to the stake whereby movement of the vehicle relative to supporting ground terrain may be restricted when the stake is driven into the ground and the clamping means is placed about the vehicle axle and fastened to the stake.

In another form of the invention, an improvement is provided for a trailer having at least one axle supported above ground terrain by a pair of wheels. The improvement comprises at least one ground anchor inhibiting movement of the trailer over the ground terrain with said anchor comprising a stake having a lower portion implanted in the ground beneath the one axle and an upper portion extending upwardly from the ground towards the axle. A clamp is held about the axle and to the stake's upper portion.

BRIEF DESCRIPITON OF THE DRAWINGS

DETAILED DESCRIPTION OF THE DRAWING

Figure 1:
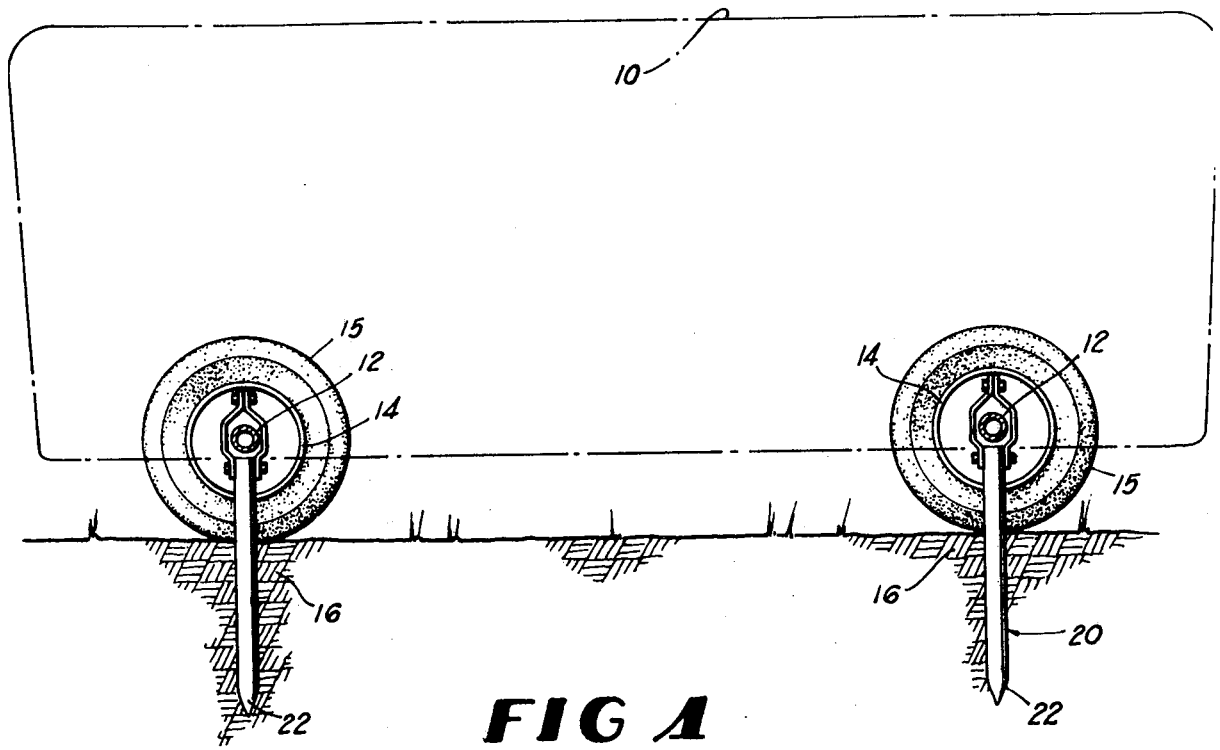
FIG. 1 is a side view in outline form of a trailer showing two trailer axles anchored to supporting ground terrain by four anchors embodying principles of the invention in one preferred form.
Figure 2:
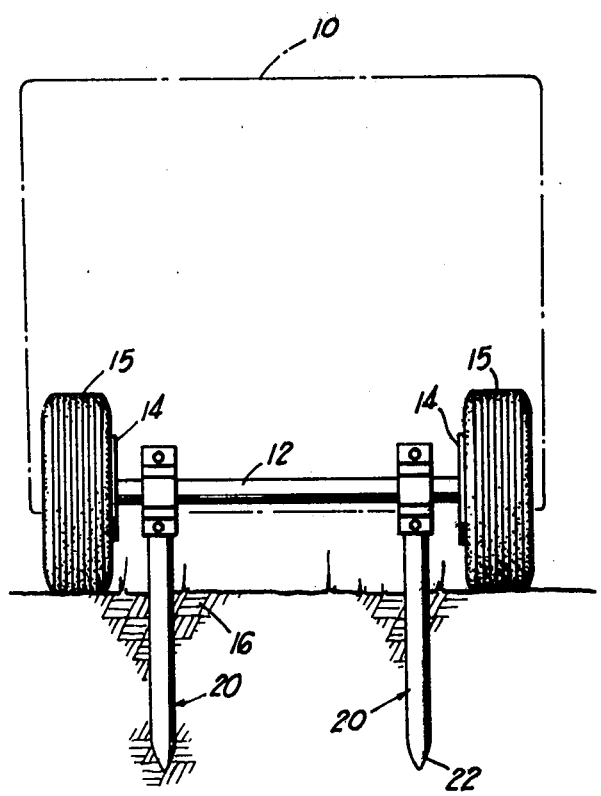
FIG. 2 is an end-on, outline view of the trailer shown in FIG. 1 together with elevational views of the ground anchors.

Referring now in more detail to the drawing, there is shown in FIGS. 1 and 2 in outline form a trailer 10 having a pair of axles 12 to each end of which is mounted a pair of wheels 14 and tires 15 rotatably supported atop supporting ground terrain 16. The trailer is anchored to the ground at this location by four anchors disposed adjacent each of the four wheels, respectively. It should, of course, be understood that any number of anchors may be employed at the discretion of the user depending on the anchoring strength desired in relation to the associated costs.

Figure 3:
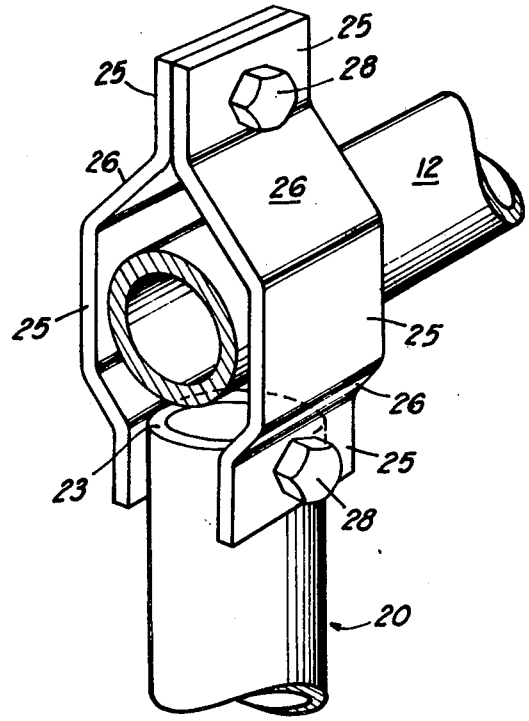
FIG. 3 is a perspective view of an upper portion of the ground anchor shown in FIGS. 1 and 2.

With continued reference to FIGS. 1 and 2 and also to FIG. 3, it may be seen that the ground anchor here comprises a metallic stake 20 having a relatively sharp end 22 and a relatively blunt end 23. This conventional stake construction enables the upper blunt end to be pounded as with a sledge hammer in driving the lower sharp end into ground. The ground anchor is further seen to include a clamp or collar comprising a pair of substantially identical plates with each plate having three mutually parallel, planar sections 25 unitarily joined together by two linking, planar sections 26. The uppermost and lowermost section 25 of each plate is provided with a central aperture. The relatively blunt end portion of the stake is also provided with diametrically opposed, axially aligned apertures. The anchor further includes a pair of bolts 28 sized to be passed through the just mentioned apertures and secured with unshown nuts to one another and to the upper portion of the stake about axle 12. In this manner the two identical plates serve as clamping or collar means in securing the axles to the stake. The clamp may not necessarily actually engage the axle but may be spaced slightly thereabout as shown in FIG. 1. This spacing serves to allow some latitude in establishing the level of the top relatively blunt end of the stake prior to disposing the vehicle axles thereabove.

To anchor the trailer to the ground the site is selected and the distance between the axles themselves and between the axles and ground measured and located at the site. The stakes are then positioned on the ground beneath the future position of the two axles at a distance apart slightly less than wheel separation along each axle. The stakes are driven into the ground to a point where they project upwardly therefrom a distance slightly less than the distance the axles are to be located about the ground. Once the stakes are so implanted the trailer is driven to the site and the axles located above each of the two sets of stakes. The pair of clamping plates are then positioned about each stake straddling an axle and then secured together and to the stake by the pair of bolts.

Figure 4:
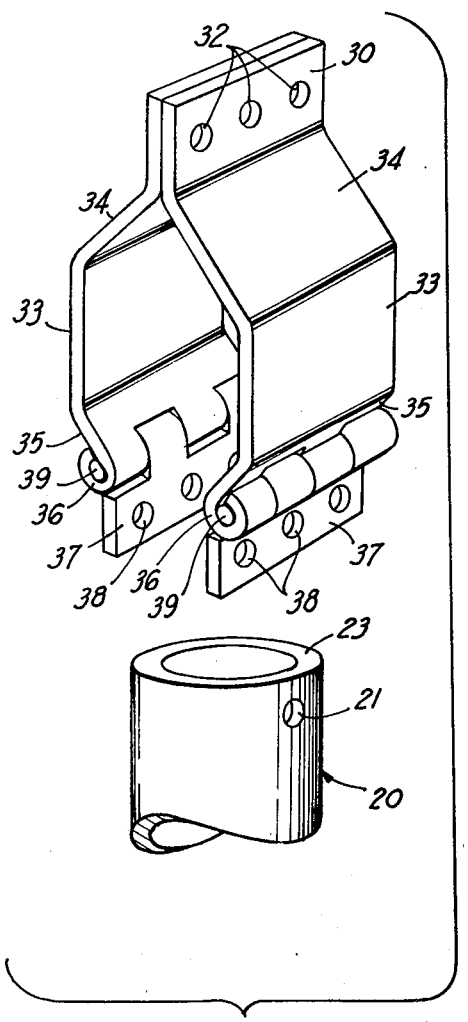
FIG. 4 is an exploded view, in perspective, of a portion of a ground anchor embodying principles of the invention in an alternative form.

In FIG. 4 an alternative embodiment is shown again comprising a stake 20 having two aligned apertures 21 in the upper end thereof adjacent the relatively blunt end 23. A pair of substantially identical plates are provided comprising an upper planar section 30 having three apertures 32 therethrough, parallel planar sections 33 joined to sections 30 by linking section 34 and to inwardly formed sections 35 that terminate in a segmented, tubular hinge section 36. A pendant hinge section 37 having three apertures 38 formed therein is pivoted to hinge section 36 by pins 39. Six unshown bolts are provided to secure the upper sections 30 together and the lower hinge sections 37 together and to stake 20. The hinges facilitate on site reuse by enabling the clamp or collar to remain on the stake without having to loosen or remove the lower bolts.

Figure 5:
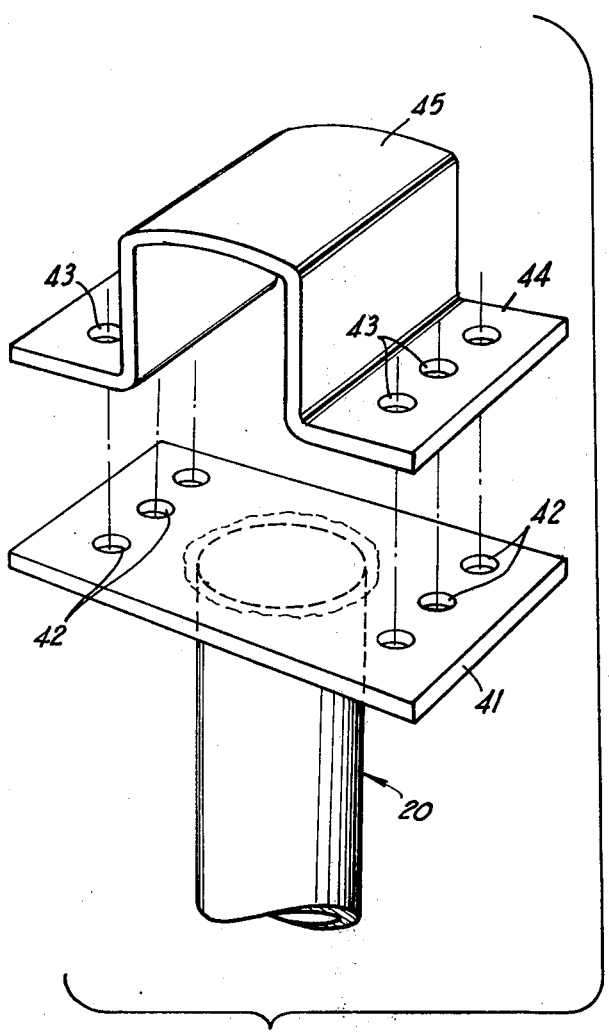
FIG. 5 is another exploded view, in perspective, of a portion of a ground anchor embodying principles of the invention in yet another form.

In FIG. 5 yet another embodiment of the invention is shown wherein a flange or plate 41 is permanently mounted atop stake 20 as by welding. Flange 41 is provided with six apertures 42 in alignment with six apertures 43 formed in flanges 44 extending coplanarly from a U-shaped axle clamping member 45. Again, six bolts are provided to secure the flanged U-shaped member atop flange 41 and stake 20 with axle 12 positioned therebetween.

Figure 6:
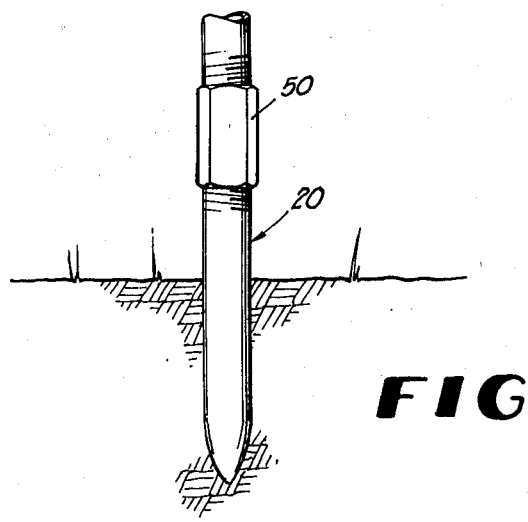
FIG. 6 is a fragmentary, vertical, sectional view of a modified ground anchor embodying principles of the invention in yet another form.

To increase height adjustability of the stake, a turnbuckle 50 may be provided as shown in FIG. 6. Here, the stake is segmented into two sections each of which has a threaded section to which the turnbuckle may be screwed. In using this type of stake the lower segment is implanted into the ground with the threaded uppor portion protruding thereabove. Thereafter the vehicle axle is positioned above the stake and the upper stake segment secured to the lower stake segment with the turnbuckle. The clamp or collar is then placed about the axle and to the upper stake segment.

We thus see that a ground anchor is provided in anchoring a land vehicle in a stationary position. So anchored the vehicle is inhibited from overturning under high wind weather conditions. The use of such anchors also, of course, inhibits the theft of the vehicle or other unauthorized relocation thereof. Though four embodiments have been illustrated it should be understood that many other modifications may be made thereto without departure from the spirit and scope of the invention as set forth in the following claims.

What is claimed is:

1. A ground anchor for a vehicle comprising, in combination, a stake having a relatively blunt end adapted to be pounded and a relatively sharp end adapted to be driven into ground upon a pounding of said blunt end; axle clamping means adapted to be placed at least partially about a vehicle axle; and fastening means for fastening said axle clamping means to said stake whereby movement of the vehicle relative to supporting ground terrain may be restricted when the stake is driven into the ground and the clamping means is placed about the vehicle axle and fastened to the stake; said clamping means comprising a pair of substantially identically shaped plates with each plate having three mutually parallel planar sections unitarily joined together by two linking sections.

2. A ground anchor for a vehicle in accordance with claim 1 wherein two of said mutually parallel planar sections of each of said plates are provided with an aperture, and wherein said fastening means comprises a pair of bolts sized to be extendable through said apertures.

3. A ground anchor for a vehicle comprising, in combination, a stake having a relatively blunt end adapted to be pounded and a relatively sharp end adapted to be driven into ground upon a pounding of said blunt end; axle clamping means adapted to be placed at least partially about a vehicle axle; and fastening means for fastening said axle clamping means to said stake whereby movement of the vehicle relative to supporting ground terrain may be restricted when the stake is driven into the ground and the clamping means is placed about the vehicle axle and fastened to the stake; said stake blunt end being provided with an apertured flange extending substantially normal to the axis of the stake, and said clamping means comprising a U-shaped member having a pair of apertured coplanar flanges extending therefrom.

4. A ground anchor for a vehicle comprising, in combination, a stake having a relatively blunt end adapted to be pounded and a relatively sharp end adapted to be driven into ground upon a pounding of said blunt end; axle clamping means adapted to be placed at least partially about a vehicle axle; and fastening means for fastening said axle clamping means to said stake whereby movement of the vehicle relative to supporting ground terrain may be restricted when the stake is driven into the ground and the clamping means is placed about the vehicle axle and fastened to the stake; said clamping means comprising a pair of substantially identically shaped plates having apertured hinges depending therefrom.

5. A ground anchor for a vehicle comprising, in combination, a stake having a relatively blunt end adapted to be pounded and a relatively sharp end adapted to be driven into ground upon a pounding of said blunt end; axle clamping means adapted to be placed at least partially about a vehicle axle; and fastening means for fastening said axle clamping means to said stake whereby movement of the vehicle relative to supporting ground terrain may be restricted when the stake is driven into the ground and the clamping means is placed about the vehicle axle and fastened to the stake; said stake being segmented into an upper section and a lower section, and said anchor further comprising a turnbuckle adjustably coupling together said stake upper and lower sections.

6. In a trailer having at least one axle supported above ground terrain by a pair of wheels, the improvement comprising at least one ground anchor inhibiting movement of the trailer over the ground terrain with said anchor comprising
   a stake having a lower portion implanted in the ground beneath said one axle, an upper portion extending upwardly from the ground toward said axle and a turnbuckle adjustably coupling together said stake lower and upper portions,
   and a clamp held about said axle and to said stake upper portion.

7. A trailer in accordance with claim 6 wherein said clamp includes a pair of structurally identical plates secured to said stake upper portion by at least one bolt.

* * * * *